(12) United States Patent
Ueda

(10) Patent No.: US 7,472,310 B2
(45) Date of Patent: Dec. 30, 2008

(54) DEBUGGING MECHANISM AND DEBUGGING REGISTER

(75) Inventor: Akira Ueda, Kadoma (JP)

(73) Assignee: Panasonic Corporation, Osaka (JP)

(*) Notice: Subject to any disclaimer, the term of this patent is extended or adjusted under 35 U.S.C. 154(b) by 458 days.

(21) Appl. No.: 11/410,160

(22) Filed: Apr. 25, 2006

(65) Prior Publication Data

US 2006/0253737 A1 Nov. 9, 2006

(30) Foreign Application Priority Data

Apr. 26, 2005 (JP) ............................. 2005-127234

(51) Int. Cl.
*G06F 11/00* (2006.01)
(52) U.S. Cl. .......................................... 714/27; 714/47
(58) Field of Classification Search ............. 714/27–29, 714/43, 46, 47, 55; 710/65, 110
See application file for complete search history.

(56) References Cited

U.S. PATENT DOCUMENTS 5,481,670 A * 1/1996 Hatashita et al. ............... 714/7
6,061,600 A * 5/2000 Ying ............................. 700/3
6,070,205 A * 5/2000 Kato et al. ................... 710/100
6,147,967 A * 11/2000 Ying et al. ................... 370/222
2004/0107265 A1* 6/2004 Yasunaga ..................... 709/213

FOREIGN PATENT DOCUMENTS

JP 05-136787 6/1993

* cited by examiner

Primary Examiner—Dieu-Minh Le
(74) Attorney, Agent, or Firm—Steptoe & Johnson LLP

(57) ABSTRACT

The present invention aims at providing a debugging mechanism capable of detecting erroneous read access to a bus slave caused by a synchronization control infringement between bus masters due to a failure of software. Each of a dirty detector and a coherency error detector is used as a detector for monitoring a bus control unit and, during a period that write access corresponding to optionally designated conditions is present on a write buffer, detecting read access corresponding to conditions equal to the aforementioned conditions. A bus master includes a debugging unit. The debugging unit receives a coherency error notification from the coherency error detector to generate a debugging event, breaks an operation of the bus master, and performs various debugging operations while using the debugging event as a trigger.

8 Claims, 3 Drawing Sheets

DEBUGGING MECHANISM AND DEBUGGING REGISTER

BACKGROUND OF THE INVENTION (1) Field of the Invention

The present invention relates to a debugging mechanism and, more particularly, to an analysis technique for use in debugging of an operation of a system having a plurality of bus masters.

(2) Description of the Related Art

In a recent system LSI, a plurality of bus masters are integrated on one LSI and share a common bus slave (e.g., a memory) in many cases. Therefore, enhancement in performance of bus access is indispensable in order to enhance not only operational performance of each bus master but also performance of an entire system.

In order to achieve the aforementioned enhancement, there are generally employed release control for write access and out of order control for bus access, as disclosed in JP3027439B. In the out of order control, consistency of an access request occurrence order and a bus access execution order is not ensured between different bus masters. Consequently, if a plurality of bus masters share a common bus slave as system specifications, synchronization between bus masters in an out of order relation must be ensured in some way. This synchronization tends to be ensured by software processing.

However, there is only software corresponding to debugging specialized for a specific bus master in a conventional software development environment. Such software is lacking in the function of debugging including a system operation of another bus masters. Therefore, it is difficult to perform debugging itself heretofore.

SUMMARY OF THE INVENTION

The present invention aims principally at realizing such debugging in consideration of an operation among a plurality of bus masters, that has been lacking in the conventional software development environment. It is therefore an object of the present invention to provide a debugging mechanism for preparing a technique capable of detecting erroneous read access to a bus slave caused by a synchronization control infringement between bus masters due to a failure of software, thereby improving facilitation of software development and reducing a time for the software development in a system LSI.

In order to achieve this object, the present invention provides a debugging mechanism in a system in which a plurality of bus masters share a common bus slave. The debugging mechanism includes a bus control unit for treating the plurality of bus masters and the bus slave, and performing release control for write access and out of order control between bus masters, a debugging register for designating various conditions for bus access to be debugged, a dirty detector for constantly monitoring an operation of the bus control unit, and detecting a status disparity period (a dirty period) from occurrence of a write access request corresponding to conditions designated by the debugging register to completion of write access to the bus slave, and a debugging unit, provided at the bus master, for treating a dirty period detection notification received from the dirty detector as an AND condition in detection of a debugging event or recording a history on tracing information. Herein, during the dirty period, the bus master provided with the debugging unit breaks an operation thereof by using a debugging event generated in establishment of operational conditions optionally designated by the debugging unit or records the dirty period detection notification on the tracing information as a history.

With this configuration, when a bus master requests write access, the dirty detector makes a comparison with conditions designated by the debugging register. Based on a result of the comparison, the dirty detector sends a notification about generation of a dirty period to a bus master designated by the debugging register. In addition, the dirty detector monitors completion of write access to a bus slave concurrently. If write access to the bus slave is executed upon detection of a dirty period so that a write buffer has no write access request, the dirty detector drops a notification about the dirty period. The bus master receiving the dirty period detection notification uses the debugging unit provided therein to break an operation upon establishment of optional operational conditions of the bus master during a dirty period or records a history on tracing information. Thus, it is possible to readily find a synchronization control infringement between bus masters.

The debugging mechanism according to the present invention also includes a coherency error detector for constantly monitoring an operation of the bus control unit, and detecting a read access request corresponding to conditions designated by the debugging register during the detection of a dirty period by the dirty detector, and a debugging unit provided at the bus master, for receiving a coherency error notification from the coherency error detector and generating a debugging event. Herein, the debugging unit uses the debugging event generated by reception of the coherency error notification from the coherency error detector to break the operation of the bus master or records a coherency error notification on tracing information as a history.

With this configuration, when a bus master requests write access, the dirty detector makes a comparison with conditions designated by the debugging register. Based on a result of the comparison, the dirty detector sends a notification about generation of a dirty period to the coherency error detector. Upon detection of a read access request coincident with conditions designated by the debugging register, the coherency error detector refers to the dirty period detection notification received from the dirty detector. During the dirty period, the coherency error detector sends a coherency error notification to a bus master requesting read access. Upon reception of the coherency error notification, the bus master provided with the debugging unit breaks an operation thereof or records a history on tracing information. Thus, it is possible to readily find erroneous bus access due to a synchronization control infringement between bus masters.

According to the present invention, one of the bus masters is a processor type bus master provided with an interrupting mechanism, and receives from the coherency error detector the coherency error notification as an interrupt request so that a software operation on the bus master is suspended upon detection of a coherency error.

With this configuration, the interrupting mechanism receives a coherency error notification to generate an interrupt, and suspends a software operation on the bus master. Thus, it is possible to find erroneous bus access due to a synchronization control infringement between bus masters.

According to the present invention, the debugging mechanism further includes a control master. Herein, one of the bus masters is a bus master provided with neither a debugging unit nor an interrupting mechanism, and controlled by the control master, and the bus master receives the coherency error notification from the coherency error detector as an error notification specified on a bus protocol so that a coherency error generation status is reflected in a status register or a status signal on the bus master, and the control master referring to this error notification recognizes generation of a coherency error.

With this configuration, in a bus master provided with neither an interrupting mechanism nor a debugging unit and controlled by another control master, the control master holds reception of a coherency error notification in a detectable manner. Thus, the control master can readily find erroneous bus access due to a synchronization control infringement between bus masters.

According to the present invention, the debugging mechanism having the aforementioned configurations can readily detect a system level failure that cannot be detected in a conventional software development environment. Thus, the debugging mechanism has an effect of improving software development efficiency in a system LSI and reducing a time required for software development in a system LSI.

DESCRIPTION OF THE PREFERRED EMBODIMENT

Hereinafter, description will be given of a preferred embodiment of the present invention with reference to the drawings.

Figure 1:
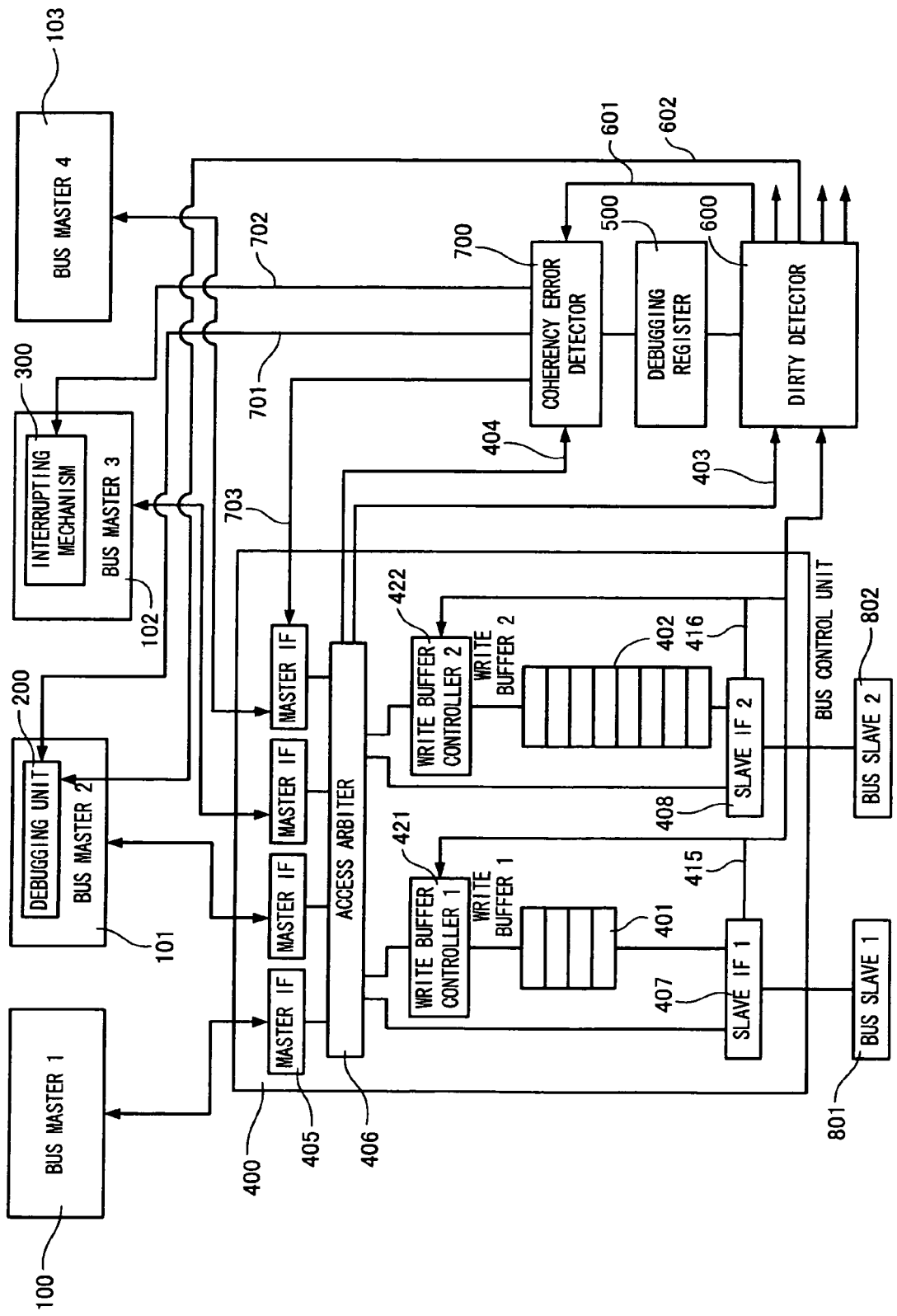
FIG. 1 illustrates an overall configuration of a debugging mechanism according to an embodiment of the present invention.

FIG. 1 illustrates an overall configuration of a debugging mechanism according to an embodiment of the present invention.

As illustrated in FIG. 1, the debugging mechanism includes a first bus master 100, a second bus master 101 provided with a debugging unit 200, a third bus master 102 provided with an interrupting mechanism 300, and a fourth bus master 103 controlled by another control master (not illustrated). The debugging mechanism also includes a bus control unit 400, a debugging register 500, a dirty detector 600, a coherency error detector 700, and bus slaves 801 and 802. Thus, there is configured a system where a plurality of bus masters share a common bus slave.

The debugging unit 200 in the second bus master 101 has a breaking function of detecting a debugging event to break an operation of the bus master 101, and a tracing function of mixing a debugging event detection notification into information about an operation history of the bus master 101. The debugging unit 200 also has a function of using, as AND conditions, optional conditions for the operation of the bus master 101 upon detection of the debugging event and, also, a dirty period notification 602 (to be described later), receiving a coherency error notification 701 (to be described later) to generate a debugging event, and breaking the operation of the bus master 101. The debugging unit 200 also has a function of adding generation of a debugging event to bus master operation tracing information to be outputted (i.e., a function of recording a history on the bus master operation tracing information). Herein, the function of adding the generation of the debugging event to the bus master operation tracing information to be outputted is optional.

The interrupting mechanism 300 in the third bus master 102 has a function of receiving a coherency error notification 702 (to be described later) to generate an interrupt and suspending an operation of the bus master 102.

The fourth bus master 103 is provided with neither an interrupting mechanism nor a debugging unit and is controlled by another control master. Upon reception of a coherency error notification (to be described below), the fourth bus master 103 breaks remaining bus access and, also, reflects a status register or a status signal on the bus master 103 (i.e., reflects a coherency error generation status) in some way to send an error notification to the control master. The control master referring to this error notification holds generation of a coherency error in a detectable manner. Thus, it is possible to find erroneous bus access due to a synchronization control infringement between bus masters.

(Bus Control Unit)

The bus control unit 400 includes write buffers 401 and 402, four master IFs 405, an access arbiter 406, slave IFs 407 and 408, and write buffer controllers 421 and 422.

The four master IFs 405 serve as interfaces to the bus masters 100 to 103 in accordance with bus protocols specified in the respective bus masters 100 to 103. The master IF 405 for the fourth bus master 103 sends a coherency error notification 703 (to be described later) of the coherency error detector 700 to the fourth bus master 103, as an error notification specified on the bus protocol.

The slave IFs 407 and 408 serve as interfaces to the bus slaves 801 and 802 in accordance with bus protocols specified in the respective bus slaves 801 and 802. The slave IFs 407 and 408 execute write access to the bus slaves 801 and 802 based on details of the write access stored in the write buffers 401 and 402, respectively. Upon completion of the write access to the bus slaves 801 and 802, the slave IFs 407 and 408 send write access completion notifications 415 and 416 to the write buffer controllers 421 and 422 and the dirty detector 600, respectively.

The write buffers 401 and 402 are of a FIFO type prepared for the bus slaves 801 and 802, respectively.

The write buffer controllers 421 and 422 are prepared for the write buffers 401 and 402, respectively. The write buffer controllers 421 and 422 temporarily store details of write access received from the access arbiter 406 in the write buffers 401 and 402, and output contents of the write buffers 401 and 402 to the slave IFs 407 and 408 in a FIFO manner through the write access completion notifications 415 and 416, respectively.

The access arbiter 406 arbitrates bus access requests issued from the master IFs 405 to the bus slaves 801 and 802, under access order control that an access order between bus masters is not ensured. When the arbitrated bus access requests are write access, the access arbiter 406 outputs details of the bus access requests to the write buffer controllers 421 and 422. On the other hand, when the arbitrated bus access requests are read access, the access arbiter 406 outputs details of the bus access requests to the slave IFs 407 and 408. Upon acceptance of write access, the access arbiter 406 sends a notification about details of the write access to the dirty detector 600, as a write information notification 403. Upon acceptance of read access, the access arbiter 406 sends a notification about details of the read access to the coherency error detector 700, as a read information notification 404.

Figure 2:
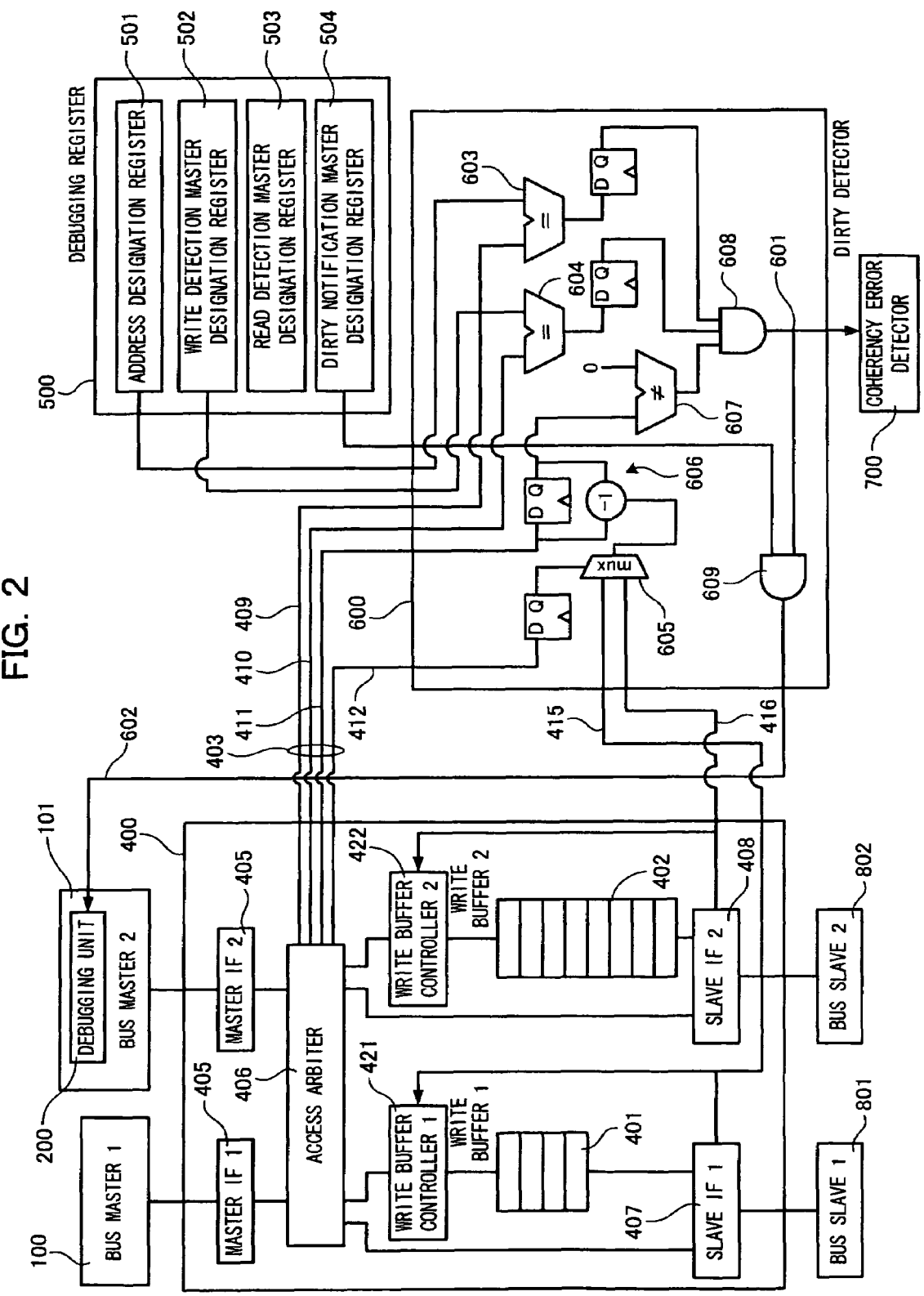
FIG. 2 specifically illustrates a configuration of a dirty detector of the debugging mechanism.

As illustrated in FIG. 2, the write information notification 403 contains write address information 409, write request master information 410, write buffer registration stage information 411 upon registration of write access in a write buffer, and write target bus slave information 412.

Figure 3:
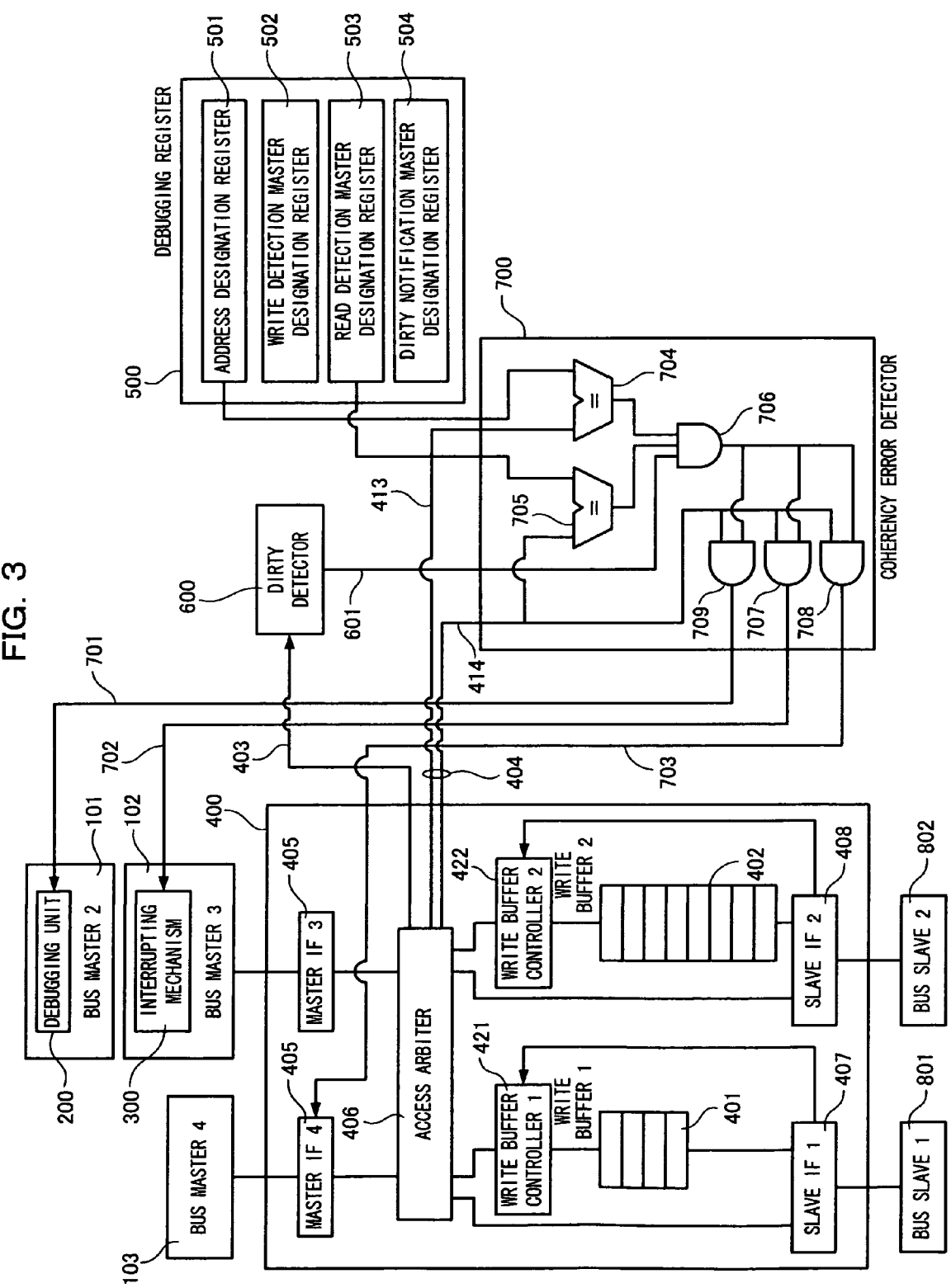
FIG. 3 specifically illustrates a configuration of a coherency error detector of the debugging mechanism.

As illustrated in FIG. 3, the read information notification 404 contains read address information 413 and read request master information 414.

(Debugging Register)

As illustrated in FIGS. 2 and 3, the debugging register 500 designates conditions for bus access detected by the dirty detector 600 and the coherency error detector 700, and includes an address designation register 501, a write detection master designation register 502, a read detection master designation register 503 and a dirty notification master designation register 504.

The address designation register 501 designates an address space to be detected. More specifically, the address designation register 501 designates address conditions for the bus slaves 801 and 802 as conditions given to the dirty detector 600 and the coherency error detector 700.

Upon detection of write access, the write detection master designation register 502 designates a write access detection target bus master as a condition given to the dirty detector 600.

Upon detection of read access, the read detection master designation register 503 designates a read access detection bus master as a condition given to the coherency error detector 700.

The dirty notification master designation register 504 designates a bus master for receiving a notification about a result of detection of a dirty period (to be described later) by the dirty detector 600.

(Dirty Detector)

The dirty detector 600 constantly monitors an operation of the bus control unit 400. The dirty detector 600 detects a bus master-bus slave status disparity period (hereinafter, referred to as "dirty period") from registration, in the write buffers 401 and 402, of write access coincident with conditions designated by the debugging register 500 to completion of access to the bus slaves (slave devices) 801 and 802, and sends a notification about this detection. In addition, the dirty detector 600 compares the write information notification 403 with contents of the debugging register 500, and sends dirty detection notifications 601 and 602 to the coherency error detector 700 and the debugging unit 200, respectively, during a period that the write information notification 403 is coincident with the contents of the debugging register 500. The aforementioned configuration will be described with reference to FIG. 2. In FIG. 2, the first bus master 100 and the second bus master 101 provided with the debugging unit 200 are targeted.

The dirty detector 600 includes a write address comparator 603, a write master comparator 604, a write access completion detection part 605, a writer counter 606, a write buffer emulation part 607, a dirty detection part 608 and a dirty notification part 609.

The write address comparator 603 compares the write address information 409 with contents (address conditions of the bus slaves 801 and 802) of the address designation register 501. If coincident, the write address comparator 603 outputs a coincidence signal.

The write master comparator 604 compares the write request master information 410 with contents (the write access detection target bus master) of the write detection master designation register 502. If coincident, the write master comparator 604 outputs a coincidence signal.

The write access completion detection part 605 selects, from details of the write target bus slave information 412, the write access completion notification 415 outputted from the slave IF 407 or the write access completion notification 416 outputted from the slave IF 408.

The write counter 606 retrieves details of the write buffer registration stage information 411 to perform a down counter operation for decreasing a write buffer registration stage each time a notification about detection by the write access completion detection part 605 is sent.

The write buffer emulation part 607 detects presence of corresponding write access on the write buffers 401 and 402 based on whether the write counter 606 has a value other than zero. Upon detection of the write access, the write buffer emulation part 607 outputs a write access presence detection signal.

When each of the coincidence signal outputted from the write address comparator 603, the coincidence signal outputted from the write master comparator 604 and the write access presence detection signal outputted from the write buffer emulation part 607 is ON state, the dirty detection part 608 detects a dirty period and outputs a result thereof.

The dirty notification part 609 sends a notification about the result of the dirty detection part 608 to a bus master designated by the dirty notification master designation register 504.

(Coherency Error Detector)

The coherency error detector 700 constantly monitors an operation of the bus control unit 400. In addition, the coherency error detector 700 detects a read access request coincident with a condition optionally designated by the debugging register 500. Then, the coherency error detector 700 sends, to a bus master requesting read access, a notification about read access during a dirty period to a memory optionally designated by the debugging register 500 using the detection result and the dirty period detection notification 601 received from the dirty detector 600. If the read information notification 404 is coincident with contents of the debugging register 500 and the dirty detection notification 601 is sent, the coherency error detector 700 sends the coherency error notifications 701 to 703 to the bus master requesting read access, based on the details of the read information notification 404. The aforementioned configuration will be described with reference to FIG. 3.

The coherency error detector 700 includes a read access comparator 704, a read master comparator 705, a coherency error detection part 706 and coherency error notification parts 707 to 709.

The read address comparator 704 compares the read address information 413 of the read information notification 404 outputted from the access arbiter 406 with an address space (address conditions of the bus slaves 801 and 802) designated by the address designation register 501. If coincident, the read address comparator 704 outputs a coincidence signal.

The read master comparator 705 compares the read request master information 414 of the read information notification 404 outputted from the access arbiter 406 with a read access detection bus master designated by the read detection master designation register 503. If coincident, the read master comparator 705 outputs a coincidence signal.

If each of the coincidence signal outputted from the read address comparator 704, the coincidence signal outputted from the read master comparator 705 and the dirty detection notification 601 outputted from the dirty detector 600 is true, the coherency error detection part 706 detects a coherency error and outputs a result thereof.

Based on details of the read request master information 414 of the read information notification 404, as the result outputted from the coherency error detection part 706, the coherency error notification part 709 sends the coherency error notification 701 to the debugging unit 200 of the bus master 102, the coherency error notification part 707 sends the coherency error notification 702 to the interrupting mechanism 300 of the bus master 103, and the coherency error notification part 708 sends the coherency error notification 703 to the fourth master IF 405.

(Action)

Next, description will be given of action by the aforementioned configuration.

When the access arbiter 406 accepts bus access requests from the bus masters 100 to 103, the bus control unit 400 determines a bus access request to be accepted, based on empty statuses of bus slaves 801 and 802 to be accessed and precedence of a bus master. With this operation, upon reception of an access request to one of the bus slaves 801 and 802 from each of the bus masters 100 to 103, the bus control unit 400 performs such access order control that a bus access execution order to the bus slave 801 or 802 is not necessarily to be coincident with a bus access request order to the bus control unit 400.

When the access arbiter 406 accepts a write access request to the bus slave 801 or 802, the bus control unit 400 performs release control for registering the write access request in the write buffer 401 or 402 prepared for the bus slave 801 or 802 and, also, sending a notification about completion of access to the bus masters 100 to 103. Each of the write buffers 401 and 402 is of a FIFO type. Write accesses are issued in order of their occurrence to the slave IF 407 or 408; thus, write access to the bus slave 801 or 802 is executed.

The dirty detector 600 receives the write information notification 403 containing the write address information 409, the write request master information 410, the write buffer registration stage information 411 and the write target bus slave information 412 each outputted from the bus control unit 400, and the write access completion notifications 415 and 416 respectively outputted from the slave IFs 407 and 408. Thus, the dirty detector 600 detects a dirty period that a write access request corresponding to a condition designated by the debugging register 500 is present on the write buffer 401 or 402 in the bus control unit 400. Next, a specific operation thereof will be described.

The dirty detection part 608 detects a dirty period based on the following three conditions: a result of detection by the write address comparator 603 that the address conditions of the bus slaves 801 and 802 of the address registration register 501 are coincident with the write address information 409, a result of detection by the write master comparator 603 that the write access detection bus master of the write detection master designation register 502 is coincident with the write request master information 410, and a result of detection that there is a write access request corresponding to a condition designated by the debugging register 500 on the write buffer 401 or 402 through determination by the write buffer emulation part 607 whether or not the write counter 606 has a value of zero while decrementing the value of the write counter 606 each time the write counter 606 receives the write buffer registration stage information 411 to store the number of registration stages in the write buffer 401 or 402 and the write access completion detection part 605 receives the write access completion notification 415 or 416 in accordance with details of the write target bus slave information 412. The result of detection of the dirty period by the dirty detection part 608 is outputted as the dirty period notification 601 such that the coherency error detector 700 utilizes the result as a coherency error detection condition. Further, the result of detection of the dirty period by the dirty detection part 608 is outputted as the dirty period notification 602 to the bus master 101 provided with the debugging unit 200 through the dirty notification part 609 in accordance with the contents of the dirty notification master designation register 504. Refinement designation of a write detection master by the write detection master designation register 502 and refinement designation of a dirty notification master by the dirty notification master designation register 504 make it possible to designate more specific conditions; thus, it is possible to attain an effect of improving debugging efficiency.

The debugging unit 200 in the bus master 101 detects a debugging event to break the operation of the bus master 101, and receives the dirty period notification 602. Then, the debugging unit 200 adds the conditions to optional conditions for the operation of the bus master 101 (AND conditions), detects a debugging event of the specific bus slave 801 or 802 during the dirty period, and adds a fact that the debugging event is generated to bus master operation tracing information to be outputted (i.e., records a history on the bus master operation tracing information). As described above, the detection of a debugging event or the recording of a history on the bus master operation tracing information makes it possible to readily find a synchronization control infringement between bus masters. Thus, it is possible to realize, as one embodiment of the present invention, a debugging mechanism capable of efficiently performing various debugging operations while using the debugging event as a trigger.

The coherency error detector 700 receives the read information notification 404 containing the read address information 413 and the read request master information 414 outputted from the bus control unit 400, and the dirty period notification 601 outputted from the dirty detector 600. Then, the coherency error detector 700 detects generation of a read access request satisfying conditions designated by the debugging register 500 during a dirty period that write access corresponding to conditions equal to the aforementioned conditions is present on the write buffer 401 or 402 in the bus control unit 400. Next, specific operations thereof will be described.

The coherency error detection part 706 detects a coherency error based on three conditions: a result of detection by the read address comparator 704 that the read address information 413 is coincident with the address conditions of the address designation register 501, a result of detection by the read master comparator 705 that the read request master information 414 is coincident with the read detection target bus master of the read detection master designation register 503, and the dirty period notification 601. The coherency error notification parts 707 to 709 send a notification about a result of detection of the coherency error by the coherency error detection part 706 to a bus master executing read access triggering the detection of the coherency error, in accordance with the read request master information 414. Refinement designation of a read detection master by the read detection master designation register 503 makes it possible to designate more specific conditions. Thus, it is possible to attain an effect of improving debugging operation efficiency.

Upon reception of the coherency error notification 701, the debugging unit 200 in the bus master 101 generates a debugging event to break the operation of the bus master 101, and adds a fact that the debugging event is generated to bus master operation tracing information to be outputted (i.e., records a history on the bus master operation tracing information). As described above, the debugging unit 200 generates the debugging event to break the operation of the bus master 101 and records a history on the bus master operation tracing information; thus, it is possible to readily find a fact that the bus master 101 erroneously executes read access during a dirty period through neglect to perform synchronization control for waiting for completion of write access by another bus master (i.e., erroneous bus access due to a synchronization control infringement between bus masters). Accordingly, it is possible to realize, as one embodiment of the present invention, a debugging mechanism capable of efficiently performing various debugging operations while using a debugging event as a trigger.

The interrupting mechanism 300 in the bus master 102 receives the coherency error notification 702 to interrupt the operation of the bus master 102. Accordingly, it is possible to realize, as one embodiment of the present invention, a debugging mechanism capable of detecting, through an interrupt, a fact that the bus master 102 erroneously executes read access to the specific bus slave 801 or 802 during a dirty period through neglect to perform synchronization control for waiting for completion of write access by another bus master (i.e., erroneous bus access due to a synchronization control infringement between bus masters), and performing a debugging operation while using the interrupt as a trigger.

The bus master 103 provided with neither the debugging unit 200 nor the interrupting mechanism 300 and controlled by another control master includes an error notification on a bus protocol to the master IF 405. The bus master 103 cannot directly receive the coherency error notification 703 unlike the coherency error notifications 701 and 702. Therefore, the coherency error notification 703 is sent to the bus master IF 405 and, then, the bus master IF 405 converts the coherency error notification 703 into an error notification on the bus protocol to send the error notification to the bus master 103. The bus master 103 receives the error notification to break remaining bus access and, also, sends an error notification to the control master in some way. Thus, it is possible to realize, as one embodiment of the present invention, a debugging mechanism capable of indirectly detecting a fact that the bus master 103 erroneously executes read access to the specific bus slave 801 or 802 during a dirty period through neglect to perform synchronization control for waiting for completion of write access by another bus master, on the control master side for controlling the bus master 103 (i.e., erroneous bus access due to a synchronization control infringement between bus masters), and performing a debugging operation while using the detection of the error as a trigger.

As described above, according to this embodiment, it is possible to monitor the bus control unit 400 to thereby detect a fact that read access corresponding to optionally designated conditions is generated during a period that write access corresponding to conditions equal to the aforementioned conditions is present on the write buffer 401 or 402. Thus, it is possible to readily detect a system level failure that cannot be found in a conventional software development environment to thereby improve software development efficiency in a system LSI. Realization of the debugging mechanism according to this embodiment makes it possible to reduce a time required for software development in a system LSI.

The debugging mechanism according to the present invention has an effect of improving software development efficiency in a system LSI and, therefore, is useful as an analysis technique for use in debugging of an operation of a system having a plurality of bus masters.

What is claimed is:

1. A debugging mechanism in a system in which a plurality of bus masters share a common bus slave, the debugging mechanism comprising:

a bus control unit for supporting the plurality of bus masters, registering details of write access requested from each bus master upon receiving the write access, and performing a release control of notifying each bus master of completion of access before completion of access to the bus slave and an access order control of not ensuring an execution order of bus access among the plurality of bus masters;

a debugging register for designating conditions of bus access subjected to debugging;

a dirty detector for constantly monitoring an operation of the bus control unit, detecting a period of status disparity between the bus master and the bus slave, the period ranging from registration of write access coincident with the conditions designated by the debugging register in the write buffer to completion of access to the bus slave, and sending a notification about the detected period; and a debugging unit, provided at the bus master, for treating the notification about detection of the status disparity period received from the dirty detector as an AND condition in detection of a debugging event, wherein the bus master provided with the debugging unit breaks an operation thereof by using a debugging event generated in establishment of operational conditions optionally designated by the debugging unit, during the status disparity period.

2. The debugging mechanism according to claim 1, wherein during the status disparity period, the bus master provided with the debugging unit adds the generation of the debugging event in establishment of the optionally designated operational conditions to bus master operation tracing information outputted from the debugging unit.

3. A debugging mechanism in a system in which a plurality of bus masters share a common bus slave, the debugging mechanism comprising:

a bus control unit for supporting the plurality of bus masters, registering details of write access requested from each bus master upon receiving the write access, and performing a release control of notifying each bus master of completion of access before completion of access to the bus slave and an access order control of not ensuring an execution order of bus access among the plurality of bus masters;

a debugging register for designating conditions of bus access subjected to debugging;

a dirty detector for constantly monitoring an operation of the bus control unit, detecting a period of status disparity between the bus master and the bus slave, the period ranging from registration of write access coincident with the conditions designated by the debugging register in the write buffer to completion of access to the bus slave, and sending a notification about the detected status disparity period;

a coherency error detector for constantly monitoring an operation of the bus control unit, detecting a read access request coincident with conditions optionally designated by the debugging register, and sending a notification to a bus master requesting read access that read access has been executed to the bus slave optionally designated by the debugging register during the status disparity period, by using the detected result and the notification about the status disparity period detected by the dirty detector read access to the bus slave optionally designated by the debugging register; and a debugging unit provided at the bus master, for receiving a coherency error notification from the coherency error detector and generating a debugging event, wherein the debugging unit breaks the operation of the bus master by using the debugging event generated due to reception of the coherency error notification from the coherency error detector.

4. The debugging mechanism according to claim 3, wherein the debugging event generated by the debugging unit due to reception of the coherency error notification from the coherency error detector is added to bus master operation tracing information outputted from the debugging unit.

5. The debugging mechanism according to claim 3, wherein one of the bus masters is a processor type bus master including an interrupting mechanism, and receives from the coherency error detector the coherency error notification as an interrupt request so that a software operation on the bus master is suspended upon detection of a coherency error.

6. The debugging mechanism according to claim 3, wherein one of the bus maters is a bus mater including none of a debugging unit and an interrupting mechanism, and a control master is provided for controlling the bus master, wherein the bus master receives the coherency error notification from the coherency error detector as an error notification specified on a bus protocol, whereby a coherency error generation status is reflected in one of a status register and a status signal on the bus master, and the generation of a coherency error is recognized by the control master referring to the coherency error generation status.

7. A debugging register included in the debugging mechanism according to claim 3, comprising:
- a register for designating address conditions for a bus slave as conditions given to a dirty detector and a coherency error detector;
- a register for designating a write access detection target bus master, as conditions given to the dirty detector; and
- a register for designating a read access detection bus master, as conditions given to the coherency error detector.

8. The debugging register according to claim 7, further comprising a register for designating a bus master for receiving a notification about a result of detection of a status disparity period by the dirty detector.

* * * * *